Patented Dec. 6, 1932

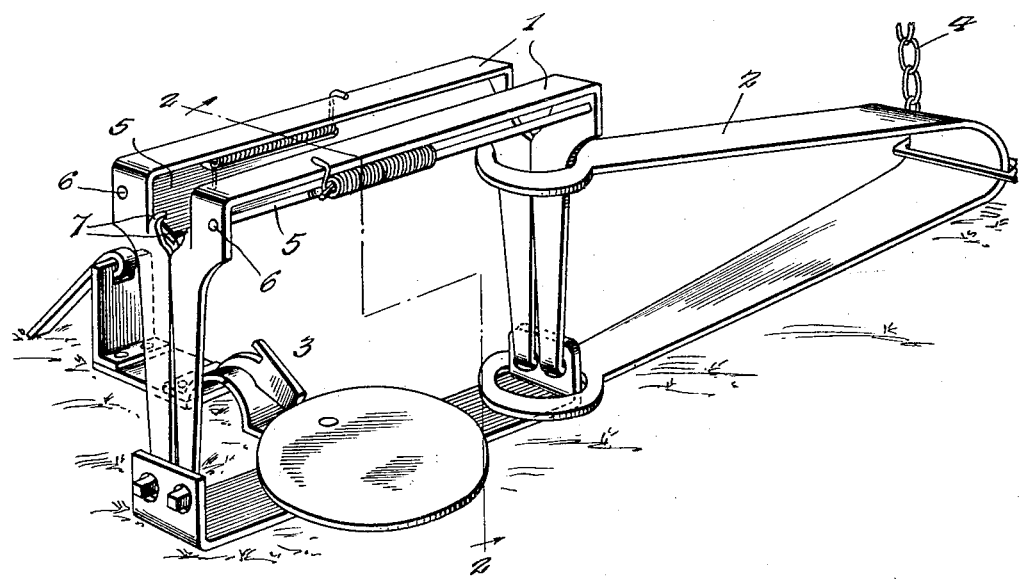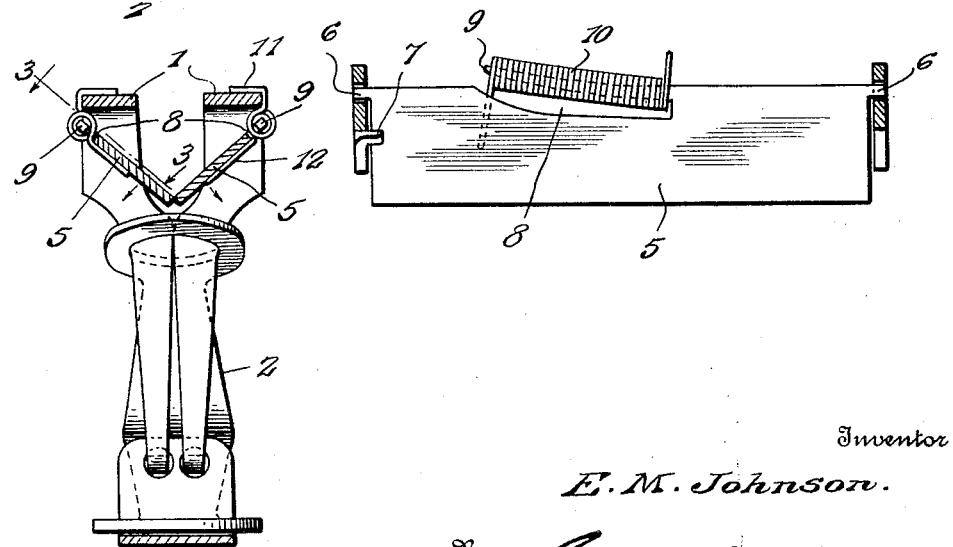

1,890,183

UNITED STATES PATENT OFFICE

EARL M. JOHNSON, OF AUDUBON, IOWA

TRAP

Application filed November 18, 1930. Serial No. 496,469.

The object of this invention is to provide means whereby an animal trap will so engage a caught animal that bones in the leg of the animal are less apt to be broken than with the traps now generally used and circulation of the animal's blood will not be violently arrested so that if the animal is to be killed its suffering will be minimized and if the purpose is to merely catch the animal and retain it in captivity the purpose will not be defeated by the death of the animal. The invention is illustrated in the accompanying drawing and will be hereinafter fully set forth.

In the drawing:

Figure 1 is a perspective view of a trap having the present invention applied thereto, Fig. 2 is a transverse section on the line 2—2 of Fig. 1, and Fig. 3 is a detail section on the line 3—3 of Fig. 2.

The trap may be of any known or approved construction and embodies the jaws 1 which are normally held in the position shown in Fig. 1 by a strong spring 2 so that if the leg of an animal be caught between the jaws the animal will be very effectually held. The trap also includes a trigger mechanism shown at 3 and an anchoring chain, indicated at 4, so that the trap may be secured at the place of use and the jaws may be held in a low open position until sprung by the animal releasing the trigger, all these parts being well known.

The traps as ordinarily constructed cause the jaws 1 to grip the leg or paw of an animal with considerable force so that bones are frequently broken and agony caused the animal, as well as its value for many purposes being reduced. In accordance with the present invention, supplemental buffer jaws 5 are provided, each of said jaws 5 being pivotally mounted between the end portions or standards of one of the jaws 1 and disposed immediately below the gripping portions of said jaws. The jaws 5 are provided at their upper outer corners with studs or trunnions 6 rotatably engaged in openings provided therefor in the end portions of the main jaws 1, and upon the main jaws are formed inwardly projecting stop lugs 7 whereby the upward or closing movement of the supplemental jaws is limited so that, while the lower edges of said supplemental jaws may meet when the trap is closed, they will be prevented from impinging so forcibly upon the animal's leg as to injure the same. In the upper outer side edge portion of each supplemental jaw is made a cut 8 extending longitudinally of the jaw, thereby producing a tongue 9 which is forced slightly outward, as shown in Fig. 3, and about this tongue is coiled a spring 10 having one end engaged over the adjacent main jaw 1, as shown at 11, and its opposite end engaged with the supplemental jaw, as shown at 12, whereby the supplemental jaw is yieldably held in the closed position shown in Figs. 1 and 2.

The trap is operated in the usual manner and when it is sprung the supplemental jaws will engage against the animal's leg or paw and will yield somewhat to the impact so that the pain inflicted upon the captive animal will be minimized. It will be noted upon reference to Fig. 2 that when no obstacle is interposed between the jaws the lower edges of the supplemental jaws will meet while the opposed edges of the main jaws will be held out of contact and this spacing of the main jaws is further attained by so shaping the end portions or standards of the same that, when the edges of said end portions are in contact, the opposed edges of the jaws will be spaced apart. As the supplemental jaws 3 will swing pivotally upon their connections with the main jaws as the animal's leg is struck, they will present their side faces to the leg so that, while the animal will be securely held, there will not be a cutting pressure exerted upon the leg. The device is very simple and may be applied to any spring jaw trap now upon the market.

Having thus described the invention, I claim:

1. The combination with the main jaws of a spring jaw trap, of supplemental jaws pivotally mounted upon the main jaws, means for yieldably holding the supplemental jaws in closed position, and stop lugs on the main jaws projecting over the supplemental jaws to limit the closing movement of the latter.

2. The combination with the main jaws of a spring jaw trap, of supplemental jaws pivoted upon the main jaws and extending longitudinally thereof, yieldable means connected with the supplemental and the main jaws for holding the supplemental jaws normally in closed position, and means on the main jaws for limiting the movement of the supplemental jaws under the influence of the last-mentioned means.

3. The combination with the main jaws of a spring jaw trap, of supplemental jaws pivotally mounted upon the main jaws and extending longitudinally of the same, longitudinally disposed tongues on the outer edges of the supplemental jaws, and torsion springs coiled around said tongues and having one end engaged over the respective main jaw and the opposite end engaged with the respective supplemental jaw.

4. The combination with the rocking main jaws of a spring jaw trap, of supplemental jaws pivotally mounted upon the main jaws and converging downwardly in closed position, and springs carried by the main and supplemental jaws urging the supplemental jaws to closed position.

In testimony whereof I affix my signature.

EARL M. JOHNSON. [L. S.].